(12) United States Patent
Watanabe et al.

(10) Patent No.: US 10,104,252 B2
(45) Date of Patent: Oct. 16, 2018

(54) IMAGE READING DEVICE, IMAGE FORMING APPARATUS AND METHOD USING THE IMAGE READING DEVICE EMPLOYING MOVABLE GUIDE PLATE HOLDING THE MEDIUM AND SHADING CORRECTION PLATE

(71) Applicants: Tetsuo Watanabe, Kanagawa (JP); Hideyuki Takayama, Kanagawa (JP); Katsuaki Miyawaki, Kanagawa (JP); Hiromichi Matsuda, Kanagawa (JP); Atsuyuki Oyamada, Tokyo (JP); Jun Yamane, Kanagawa (JP); Takashi Hashimoto, Kanagawa (JP)

(72) Inventors: Tetsuo Watanabe, Kanagawa (JP); Hideyuki Takayama, Kanagawa (JP); Katsuaki Miyawaki, Kanagawa (JP); Hiromichi Matsuda, Kanagawa (JP); Atsuyuki Oyamada, Tokyo (JP); Jun Yamane, Kanagawa (JP); Takashi Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1 day.

(21) Appl. No.: 15/357,150

(22) Filed: Nov. 21, 2016

(65) Prior Publication Data
US 2017/0149989 A1  May 25, 2017

(30) Foreign Application Priority Data
Nov. 25, 2015 (JP) .................................. 2015-229694

(51) Int. Cl.
*H04N 1/00* (2006.01)
*H04N 1/028* (2006.01)
(Continued)

(52) U.S. Cl.
CPC ..... *H04N 1/00814* (2013.01); *G03G 15/5062* (2013.01); *G03G 15/55* (2013.01);
(Continued)

(58) Field of Classification Search
CPC combination set(s) only.
See application file for complete search history.

(56) References Cited

U.S. PATENT DOCUMENTS 5,864,408 A * 1/1999 Kumashiro ............ H04N 1/401
358/461
2003/0020760 A1 1/2003 Takatsu et al.
(Continued)

FOREIGN PATENT DOCUMENTS

JP  10-304195  11/1998
JP  2003-140880  5/2003
(Continued)

OTHER PUBLICATIONS

Extended European Search Report dated Feb. 22, 2017 issued in corresponding European Application No. 16198951.2.

*Primary Examiner* — Barbara Reinier
(74) *Attorney, Agent, or Firm* — Harness, Dickey & Pierce, P.L.C.

(57) ABSTRACT

An image reading device, which is included in an image forming apparatus and used to perform a method of reading images, includes an image reading body configured to read one of a recording medium and the recording medium together with a background area adjacent to the recording medium, a moving body disposed facing the image reading body, and a reference body as a reference in shading correction. The moving body is configured to hold the recording medium and the reference body in a direction intersecting a sheet conveying direction of the recording
(Continued)

medium such that the recording medium and the reference body contact to and separate from the image reading body.

14 Claims, 11 Drawing Sheets

(51) Int. Cl.
  *H04N 1/031* (2006.01)
  *H04N 1/12* (2006.01)
  *G03G 15/00* (2006.01)

(52) U.S. Cl.
  CPC ....... *H04N 1/00045* (2013.01); *H04N 1/0057* (2013.01); *H04N 1/00785* (2013.01); *H04N 1/0285* (2013.01); *H04N 1/031* (2013.01); *H04N 1/125* (2013.01); *H04N 1/1225* (2013.01); *G03G 15/6555* (2013.01); *G03G 2215/00569* (2013.01); *H04N 2201/0081* (2013.01); *H04N 2201/0094* (2013.01)

(56) References Cited

U.S. PATENT DOCUMENTS

| | | |
|---|---|---|
| 2004/0164691 A1 | 8/2004 | Andoh et al. |
| 2009/0262401 A1 | 10/2009 | Sheng |
| 2012/0203497 A1 | 8/2012 | Yamane et al. |
| 2013/0135698 A1 | 5/2013 | Sumioka et al. |

FOREIGN PATENT DOCUMENTS

| | | |
|---|---|---|
| JP | 2004-056468 | 2/2004 |
| JP | 2004-187413 | 7/2004 |
| JP | 2004-274093 | 9/2004 |
| JP | 2005-077681 | 3/2005 |
| JP | 2008-188860 | 8/2008 |
| JP | 2009-020351 | 1/2009 |
| JP | 2009-147544 | 7/2009 |
| JP | 2012-133021 | 7/2012 |
| JP | 2012-181185 | 9/2012 |
| JP | 2013-031162 | 2/2013 |
| JP | 2014-049872 A | 3/2014 |
| JP | 2014-134758 | 7/2014 |

\* cited by examiner

IMAGE READING DEVICE, IMAGE FORMING APPARATUS AND METHOD USING THE IMAGE READING DEVICE EMPLOYING MOVABLE GUIDE PLATE HOLDING THE MEDIUM AND SHADING CORRECTION PLATE

CROSS-REFERENCE TO RELATED APPLICATION

This patent application is based on and claims priority pursuant to 35 U.S.C. § 119(a) to Japanese Patent Application No. 2015-229694, filed on Nov. 25, 2015, in the Japan Patent Office, the entire disclosure of which is hereby incorporated by reference herein.

BACKGROUND

Technical Field

This disclosure relates to an image reading device, an image forming apparatus such as a copier, printer, facsimile machine, and a multi-functional apparatus including at least two functions of the copier, printer, and facsimile machine, and incorporating the image reading device, and a method of reading images using the image reading device.

Related Art

In image reading devices such as scanners, density of scanned images changes as time elapses due to changes over time in an amount of light emitted from a light source and in sensitivity of reading elements along with change in temperature. In order to address this inconvenience, shading correction is performed between image reading jobs so that quality of reading images is maintained at a constant level.

For example, when a recording medium is conveyed to an exposure glass of a known image reading device, a rear roller rotates to convey the recording medium to a contact image sensor disposed between the exposure glass and the rear roller.

A white reference sheet disposed above the rear roller is moved with rotation of an arm from a standby position toward a reading position. As the rear roller rotates, the white reference sheet is conveyed between the exposure glass and the rear roller. An image on the white reference sheet is read by the contact image sensor for performing a shading correction.

SUMMARY

At least one aspect of this disclosure provides an image reading device including an image reading body configured to read one of a recording medium and the recording medium together with a background area adjacent to the recording medium, a moving body disposed facing the image reading body, and a reference body as a reference in shading correction. The moving body is configured to hold the recording medium and the reference body in a direction intersecting a sheet conveying direction of the recording medium such that the recording medium and the reference body contact to and separate from the image reading body.

Further, at least one aspect of this disclosure provides a method of reading images using the above-described image reading device, the method including moving the reference body to a reading position facing the image reading body from a retreating position separated from the reading position, locating at least one reflector at the reading position, reading the at least one reflector, moving the moving body to an intermediate position located between a close position at which the moving body and the image reading body are disposed close to each other and a separate position at which the moving body and the image reading body are separated from each other, shifting the reference body in the sheet conveying direction by a predetermined distance, moving the moving body to the separate position, and shifting the reference body to the retreating position.

Further, at least one aspect of this disclosure provides an image forming apparatus including the above-described image reading device and an image forming device configured to form an image on a surface of the recording medium positionally corrected by the image reading device.

DETAILED DESCRIPTION

Figure 1:
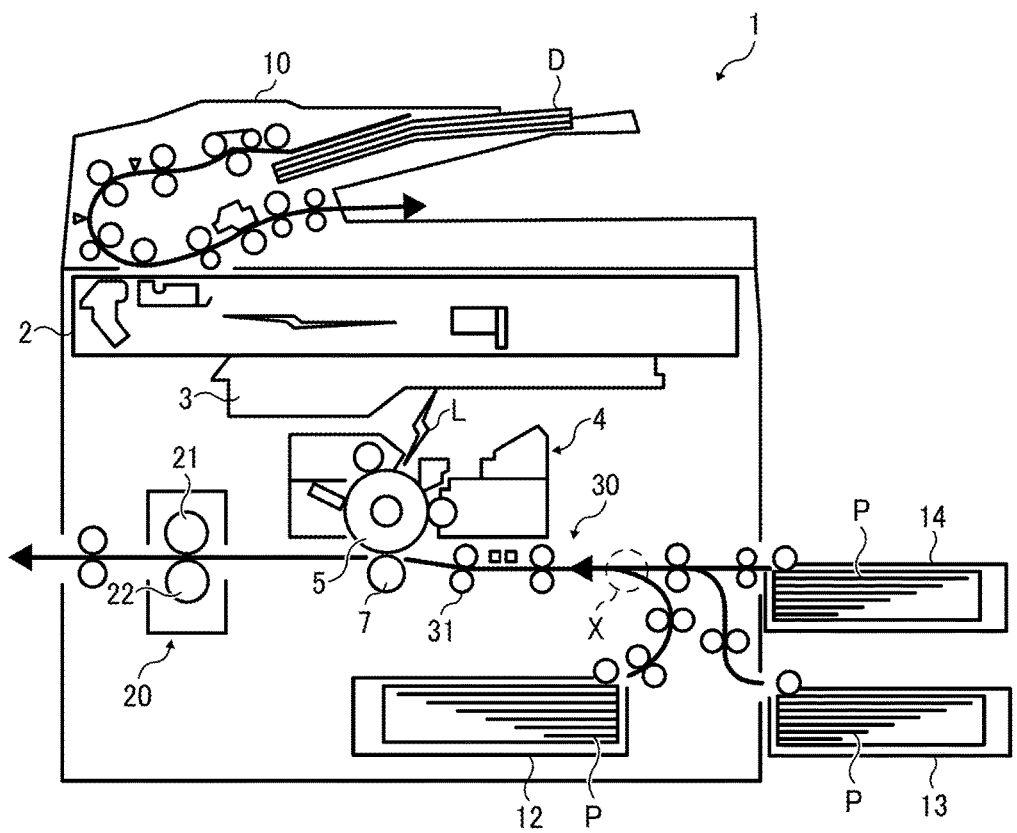
FIG. 1 is a diagram illustrating a schematic configuration of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of an entire configuration and functions of an image forming apparatus 100 according to an embodiment of this disclosure.

FIG. 1 is a diagram illustrating a schematic configuration of an image forming apparatus 1 according to an embodiment of this disclosure.

It is to be noted that identical parts are given identical reference numerals and redundant descriptions are summarized or omitted accordingly.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

FIG. 1 is a diagram illustrating a schematic configuration of the image forming apparatus 1 according to an example of this disclosure.

In FIG. 1, the image forming apparatus 1 includes a document reading unit 2, an exposure unit 3, an image forming device 4, a photoconductor drum 5, a transfer roller 7, a document conveying unit 10, a first sheet feeding unit 12, a second sheet feeding unit 13, a third sheet feeding unit 14, a fixing device 20, a sheet conveying device 30, and a pair of sheet holding rollers 31.

The document reading unit 2 optically reads image data of an original document D.

The exposure unit 3 emits an exposure light L based on the image data read by the document reading unit 2 to irradiate the exposure light L on a surface of the photoconductor drum 5 that functions as an image bearer.

The image forming device 4 forms a toner image on the surface of the photoconductor drum 5. The photoconductor drum 5 that functions as an image bearer and the transfer roller 7 that functions as a transfer unit are included in the image forming device 4.

The transfer roller 7 is included in the image forming device 4 to transfer the toner image formed on the surface of the photoconductor drum 5 onto a recording medium P.

The document conveying unit 10 conveys the original document D set on a document tray or loader to the document reading unit 2.

The first sheet feeding unit 12, the second sheet feeding unit 13, and the third sheet feeding unit 14 are sheet cassettes each of which accommodates the recording medium (sheet) P such as a transfer sheet therein.

The fixing device 20 includes a fixing roller 21 and a pressure roller 22 to fix an unfixed image formed on the recording medium P to the recording medium P by application of heat and pressure.

The sheet conveying device 30 conveys the recording medium P to the sheet conveying passage. The transfer roller 7 is also included in the sheet conveying device 30 as a downstream side conveying roller.

The pair of sheet holding rollers 31 functions as a rotary body (e.g., a pair of registration rollers and a pair of timing rollers) to convey the recording medium P to the transfer roller 7. The pair of sheet holding rollers 31 is also referred to as a pair of lateral shift and skew correction rollers.

Figure 2:
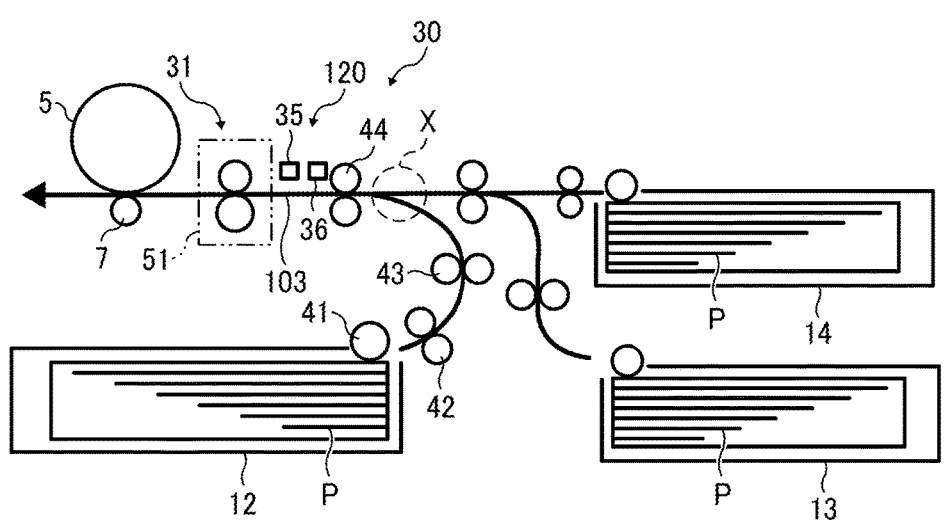
FIG. 2 is a schematic diagram illustrating an image reading device according to an embodiment of this disclosure and units disposed near the image reading device included in the image forming apparatus of FIG. 1.
Figure 3:
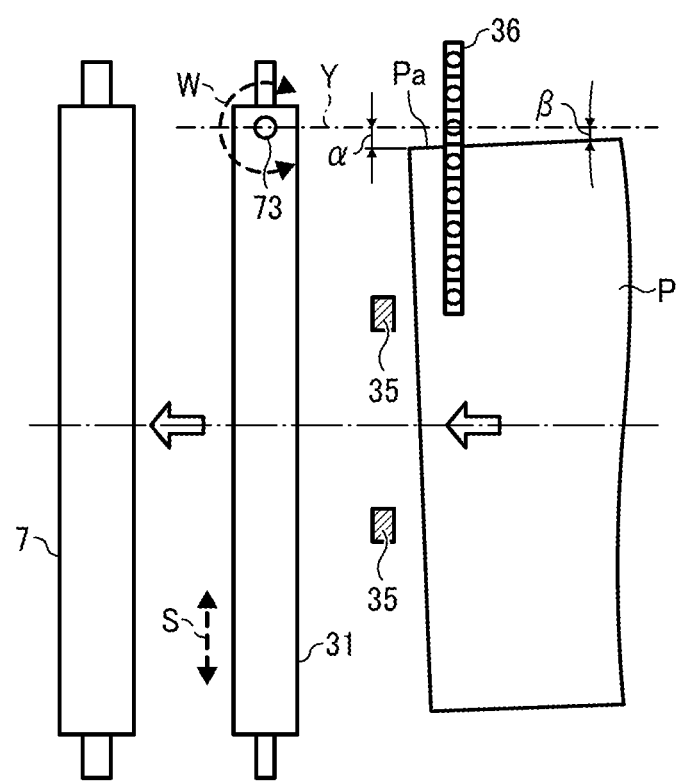
FIG. 3 is a plan view illustrating a sheet conveying device.

A description is given of regular image forming operations performed in the image forming apparatus 1 according to an example of this disclosure, with reference to FIGS. 1 through 3.

The original document D is fed from a document loading table provided to the document conveying unit 10 and conveyed by multiple pairs of sheet conveying rollers disposed in the document conveying unit 10 in a direction indicated by arrow in FIG. 1 over the document reading unit 2. At this time, the document reading unit 2 optically reads image data of the original document D passing over the document reading unit 2. The image data optically scanned by the document reading unit 2 is converted to electrical signals. The converted electrical signals are transmitted to the exposure unit 3. Then, the exposure unit 3 emits exposure light (laser light) L based on the image data of the electrical signals toward the surface of the photoconductor drum 5 of the image forming device 4.

By contrast, the photoconductor drum 5 of the image forming device 4 rotates in a clockwise direction in FIG. 1. After a series of given image forming processes, e.g., a charging process, an exposing process, and a developing process, a toner image corresponding to the image data is formed on the surface of the photoconductor drum 5. Thereafter, the toner image formed on the surface of the photoconductor drum 5 is transferred by the transfer roller 7, in the transfer nip in the image forming device 4 where the transfer roller 7 and the photoconductor drum 5 contact to each other, onto the recording medium P conveyed by the pair of sheet holding rollers 31 that functions as a pair of registration rollers.

The recording medium P is conveyed to the transfer roller 7 as follows.

As illustrated in FIGS. 1 and 2, one of the first sheet feeding unit 12, the second sheet feeding unit 13, and the third sheet feeding unit 14 of the image forming apparatus 1 is selected automatically or manually. It is to be noted that the first sheet feeding unit 12, the second sheet feeding unit 13, and the third sheet feeding unit 14 basically have an identical configuration to each other, except the second sheet feeding unit 13 and the third sheet feeding unit 14 disposed outside an apparatus body of the image forming apparatus 1. For example, when the first sheet feeding unit 12 of the image forming apparatus 1 is selected, an uppermost recording medium P accommodated in the first sheet feeding unit 12 is fed by a sheet feed roller 41 to a curved sheet conveying passage in which a first pair of sheet conveying rollers 42 and a second pair of sheet conveying rollers 43 are disposed.

The recording medium P travels in the curved sheet conveying passage toward a merging point X where the sheet conveying passage of the recording medium P fed from the first sheet feeding unit 12 and respective sheet conveying passages of the recording medium P fed from the second sheet feeding unit 13 and the third sheet feeding unit 14 disposed outside an apparatus body of the image forming apparatus 1 merge.

After passing the merging point X, the uppermost recording medium P passes a straight sheet conveying passage 103 in which a third pair of sheet conveying rollers 44 and a matching unit 51 are disposed, and reaches the matching unit 51. The pair of sheet holding rollers 31, which is provided to the matching unit 51, corrects skew or inclination of the recording medium P in the sheet conveying direction and lateral shift of the recording medium P in a width direction, which is a direction perpendicular to the sheet conveying direction, so as to adjust the recording medium to a normal position. The recording medium P is then conveyed toward the transfer roller 7 in synchronization with movement of the toner image formed on the surface of the photoconductor drum 5 for positioning.

After completion of the transferring process, the recording medium P passes the transfer roller 7 and reaches the fixing device 20 via the sheet conveying passage.

In the fixing device 20, the recording medium P is conveyed between the fixing roller 21 and the pressure roller 22, so that the toner image is fixed to the recording medium P by heat applied by the fixing roller 21 and pressure applied by the fixing roller 21 and the pressure roller 22. The recording medium P with the toner image fixed thereto passes a nip region formed between the fixing roller 21 and the pressure roller 22, and then exits from the image forming apparatus 1.

Accordingly, a series of image forming processes is completed.

As described above, the image forming apparatus 1 includes the straight sheet conveying passage 103 that is defined by straight conveying guide plates and extends substantially linearly along the sheet conveying direction of the recording medium P. The straight sheet conveying passage 103 defined by the straight conveying guide plates is a sheet conveying passage from the merging point X, where a branched sheet conveying passage from the first sheet feeding unit 12, which is disposed in the image forming apparatus 1, and the other branched sheet conveying passages from the second sheet feeding unit 13 and the third sheet feeding unit 14, both of which are disposed outside the image forming apparatus 1 merge, to the transfer roller 7. As described above, the straight sheet conveying passage 103 is defined by the straight conveying guide plates that hold both sides (front and back sides) of the recording medium P therebetween while the recording medium P is being conveyed. The third pair of sheet conveying rollers 44, an image reading device 120 including a contact image sensor 36 (hereinafter, a contact image sensor is referred to as a CIS) that is a position detector to detect a lateral shift of the recording medium P, skew detecting sensors 35 that are inclination detectors, and a pair of sheet holding rollers 31 are disposed along the sheet conveying direction.

Each of the first pair of sheet conveying rollers 42, the second pair of sheet conveying rollers 43, the third pair of sheet conveying rollers 44, the pair of sheet holding rollers 31, and other pairs of sheet conveying rollers disposed in the sheet conveying device 30 is a roller pair having a driving roller driven by a driving mechanism and a driven roller that is rotated with the driving roller by a frictional resistance with the driving roller. According to this configuration, the recording medium P is conveyed while being held between these pairs of two rollers.

The pair of sheet holding rollers 31 is included in the matching unit 51 to align positional shifts of the recording medium P, which are a lateral shift correction and a skew correction. The lateral shift correction is an operation to correct a lateral shift in a width direction of the recording medium P. The skew correction is an operation to correct skew, which is an angle deviation to an oblique side in the sheet conveying direction.

Specifically, as illustrated in FIG. 3, viewing the sheet conveying device 30 from above, the pair of sheet holding rollers 31 rotates about a shaft 73 that functions as a rotation fulcrum to an oblique side and an opposite side to the oblique side (in a direction indicated by arrow W in FIG. 3). At the same time, the pair of sheet holding rollers 31 moves in a width direction of the recording medium P, which is a direction indicated by arrow S in FIG. 3. Consequently, the pair of sheet holding rollers 31 rotates about the shaft 73 to perform the skew correction based on results detected by the skew detecting sensors 35 and moves in the width direction S of the recording medium P to perform the lateral shift correction based on results detected by the CIS 36.

The skew detecting sensors 35 is provided to detect an amount of inclination (skew) of the recording medium P in the sheet conveying passage to the oblique side in the sheet conveying direction. Specifically, the skew detecting sensors 35 includes two photosensors (i.e., a light emitting element such as LED and a light receiving element such as a photodiode) disposed equally spaced apart from a lateral center position in the width direction. The skew detecting sensors 35 detect the amount of inclination (skew) $\beta$ of the recording medium P by detecting a shift or deviation of the timing at which the leading edge of the recording medium P passes thereby. Consequently, in the present embodiment of this disclosure, the pair of sheet holding rollers 31 perform the skew correction based on results detected by the skew detecting sensors 35 while holding and conveying the recording medium P.

For example, a dotted line with a reference letter "Y" in FIG. 3 indicates a reference position of the recording medium P at which an edge in the width direction of the recording medium P is located when the recording medium P is conveyed without inclination and lateral shift. The recording medium P illustrated in FIG. 3 is tilted to a forward direction (of rotation of the pair of sheet holding rollers 31) relative to the reference position Y by a predetermined angle, which is equal to the amount of inclination $\beta$. When the skew detecting sensors 35 detects the state of the recording medium P in FIG. 3, a controller determines the amount of inclination $\beta$ as a correction amount and rotates the pair of sheet holding rollers 31 by the amount of inclination $\beta$ in a reverse direction (of rotation of the pair of sheet holding rollers 31, which is a clockwise direction in FIG. 3) while the pair of sheet holding rollers 31 is holding the recording medium P.

Consequently, the CIS 36 that functions as an image reading mechanism is disposed upstream from the pair of sheet holding rollers 31 and downstream from the third pair of sheet conveying rollers 44 in the sheet conveying passage in the sheet conveying direction. Specifically, the CIS 36 includes multiple photosensors (i.e., light emitting elements such as LEDs, light receiving elements such as photodiodes, and image forming lenses) disposed equally spaced apart in the width direction. The CIS 36 detects a lateral shift of the recording medium P in the width direction by detecting a position of a side edge Pa at one end in the width direction of the recording medium P. Based on the detection result of the CIS 36, the pair of sheet holding rollers 31 performs the lateral shift correction.

For example, as illustrated in FIG. 3, the recording medium P is shifted laterally in the width direction toward one end of the recording medium P (toward a lower side in FIG. 3) by a distance a relative to the reference position Y (indicated by a dotted line). When the CIS 36 detects this state of the recording medium P, the controller determines the distance a, in other words, an amount of lateral shift a as a correction amount and moves the pair of sheet holding rollers 31 by the amount of lateral shift a toward an opposite side in the width direction (toward an upper side in FIG. 3) while the pair of sheet holding rollers 31 is holding the recording medium P.

As described above, the CIS 36 detects the position of the side edge Pa at the one end in the width direction of the recording medium P, in other words, the CIS 36 discriminates the image density of an edge portion of the recording medium P and the image density of a background adjacent to and around the edge portion of the recording medium P. Accordingly, the amount of lateral shift of the recording medium P in the width direction is detected, and therefore the position of the recording medium P is corrected.

Now, a description is given of the image reading device 120 that includes the CIS 36.

Figure 4:
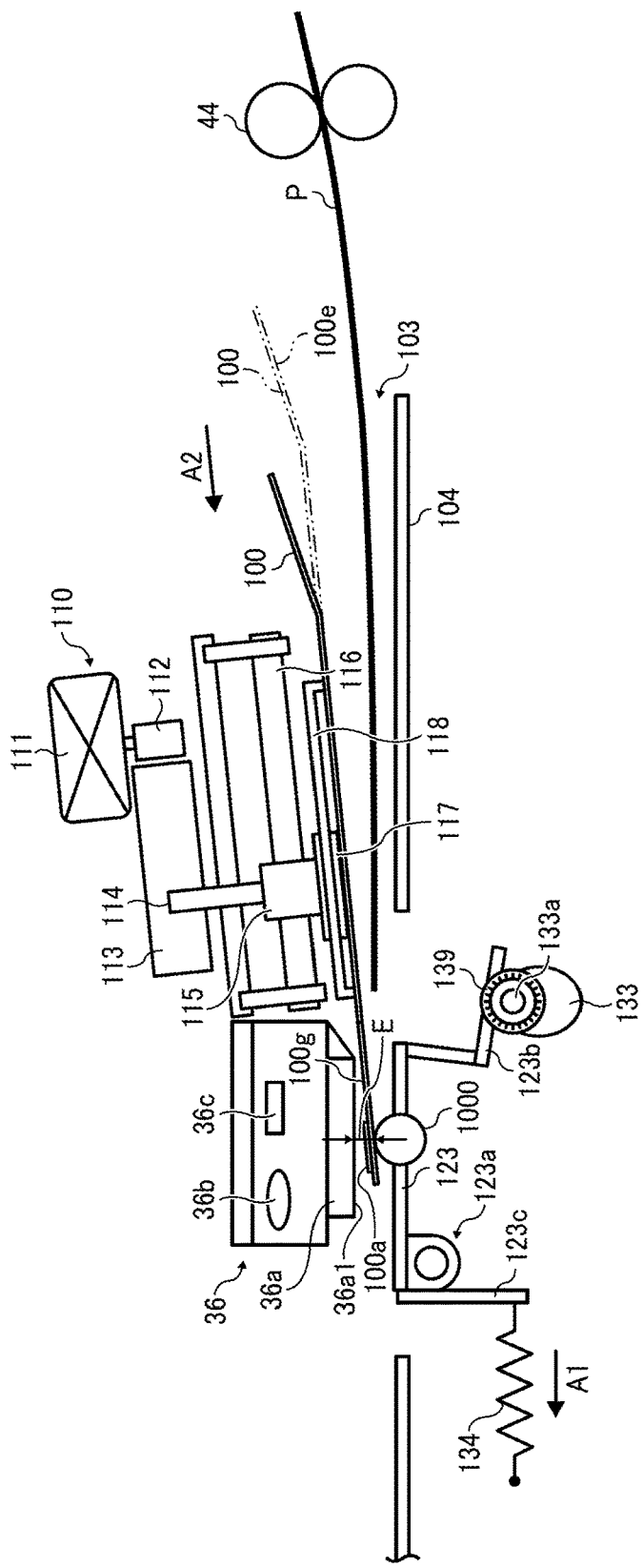
FIG. 4 is a cross sectional view illustrating the image reading device of FIG. 2.

As illustrated in FIG. 4, the image reading device 120 includes the CIS 36, a movable guide plate 123, a correction plate 100, and a driving device 110. The movable guide plate 123 functions as a moving body disposed below the CIS 36. The driving device 110 is configured to move the correction plate 100 reciprocally. The driving device 110 includes a motor 111, a rotary shaft 112, a first cam 113, and a transmission shaft 114. A detailed configuration of the driving device 110 is described below.

Now, a description is given of configurations of the CIS 36 and the movable guide plate 123.

The CIS 36 includes an exposure glass 36a, a light emitting element 36b, and a light receiving element 36c. The exposure glass 36a is a glass to which the recording medium P closely contacts. The light emitting element 36b emits light to the exposure glass 36a. The light receiving element 36c receives reflection light reflected by the exposure glass 36a. The light emitting element 36b emits light toward the correction plate 100 and the recording medium P in a state in which the correction plate 100 and the recording medium P are pressed against and closely contact with the exposure glass 36a. Consequently, the light receiving element 36c receives the light reflected by the correction plate 100 and the recording medium P. The exposure glass 36a has an opposing face that faces the movable guide plate 123. The opposing face of the exposure glass 36a is a face to which the light emitting element 36b emits light and by which the reflection light reflected by the recording medium P and the correction plate 100 is received.

It is to be noted that the recording medium P to be read by the CIS 36 may have a predetermined distance separated from the exposure glass 36a even in a state in which the recording medium P is in closely contact with the exposure glass 36a.

A one end 123b of the movable guide plate 123 contacts a second cam 133 and an opposed end 123c of the movable guide plate 123 is attached to a spring 134. The movable guide plate 123 rotates about a rotation fulcrum 123a. According to this rotation, the movable guide plate 123 is attached to and detached from the exposure glass 36a of the CIS 36. The movable guide plate 123 holds the recording medium P conveyed thereto and the correction plate 100 that is disposed at a reading position, so that the rotation of the movable guide plate 123 causes the recording medium P and the correction plate 100 to approach or separate from the light emitting and receiving face 36a1 of the exposure glass 36a. The direction in which the recording medium P and the correction plate 100 to approach or separate from the light emitting and receiving face 36a1 of the exposure glass 36a is a direction intersecting the sheet conveying direction of the recording medium P, which is a direction including components vertical to the light emitting and receiving face 36a1 (a vertical direction in FIG. 4).

The opposed end 123c of the movable guide plate 123 is biased by the spring 134 with a biasing force in a direction indicated by arrow A1 in FIG. 4. Further, the movable guide plate 123 rotates about the rotation fulcrum 123a in the clockwise direction by the biasing force, so that the one end 123b is brought into contact with the second cam 133 at a contact position. By so doing, the movable guide plate 123 is held at the contact position.

The second cam 133 is rotatable about a cam shaft 133a. Due to this rotation, the one end 123b of the movable guide plate 123 changes a contact face, so that the movable guide plate 123 rotates in a counterclockwise direction against the biasing force applied by the spring 134. In FIG. 4, the second cam 133 is in contact with the one end 123b at the short diameter portion and is retained at a position where a gap E between the movable guide plate 123 and the exposure glass 36a becomes largest. An encoder 139 is attached to the cam shaft 133a to coaxially rotate with the second cam 133 about the cam shaft 133a.

Figure 7:
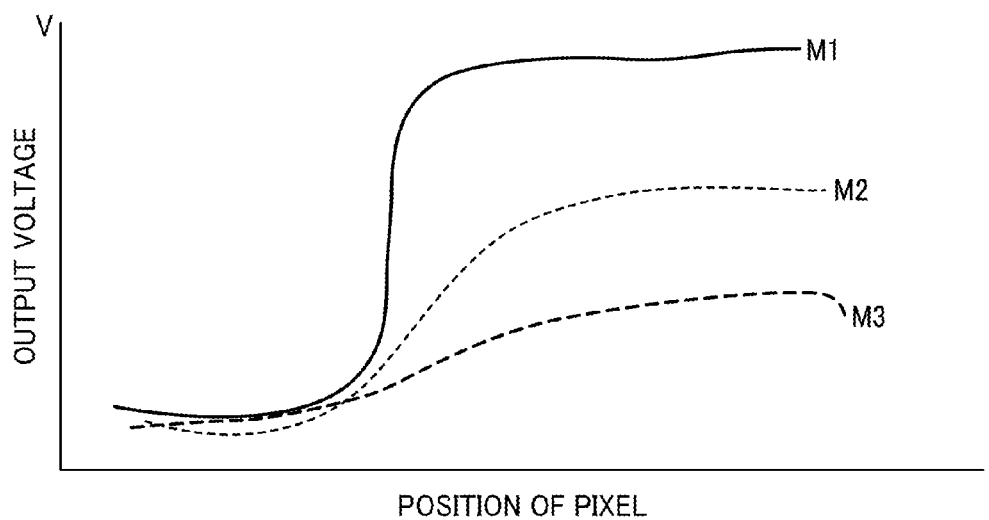
FIG. 7 is a diagram illustrating output voltages of a light receiving element.

When the recording medium P conveyed in the sheet conveying passage 103 comes to a position where the recording medium P faces the CIS 36, the second cam 133 rotates about the cam shaft 133a with a driving force exerted by a drive source that is coupled with the cam shaft 133a. Then, as illustrated in FIG. 7, when the second cam 133 rotates to a contact position where a long diameter portion of the second cam 133 comes to contact with the one end 123b of the movable guide plate 123, the movable guide plate 123 rotates in the counterclockwise direction against the biasing force of the spring 134. As a result, the recording medium P on the movable guide plate 123 is pressed against the exposure glass 36a. By pressing the recording medium P to the exposure glass 36a, the amount of lateral shift of the recording medium P in the width direction is detected.

In the present embodiment, the movable guide plate 123 has an arc-shaped projection 1000 as a face of the contact portion thereof to be pressed against the light emitting and receiving face 36a. The projection 1000 having an arc shape is formed to project toward the CIS 36, as illustrated in FIG. 7. According to this configuration, the movable guide plate 123 comes into substantially linear contact with the light emitting and receiving face 36a1. Even though the projection 1000 having an arc shape is pressed against the light emitting and receiving face 36a1, the shape of the contact portion at which the movable guide plate 123 contacts the light emitting and receiving face 36a1 is not limited thereto. For example, the projection 1000 may be a roller or a rotary body. Alternatively, the movable guide plate 123 may have a linear shaped portion to be pressed against the light emitting and receiving face 36a1.

The CIS 36 according to the present embodiment reads the recording medium P for correcting the position of the recording medium P and reads the correction plate 100 that is pressed against the exposure glass 36a by the movable guide plate 123. By so doing, the CIS 36 performs shading correction based on the detection results obtained through the reading operations.

Now, a description is given of configurations of the correction plate 100 and the driving device 110 that moves the correction plate 100 to the reading position.

As illustrated in FIG. 4 and briefly described above, the driving device 110 includes the motor 111, the rotary shaft 112 that is coupled with the motor 111, the first cam 113 that is configured to contact the rotary shaft 112, and the transmission shaft 114. The driving device 110 further includes bearings 115, guide shafts 116, and a fixing plate 117 below the transmission shaft 114. The transmission shaft 114 has a lower end where the transmission shaft 114 is coupled with the fixing plate 117. The driving device 110 is coupled with the correction plate 100 via the fixing plate 117.

Figure 5:
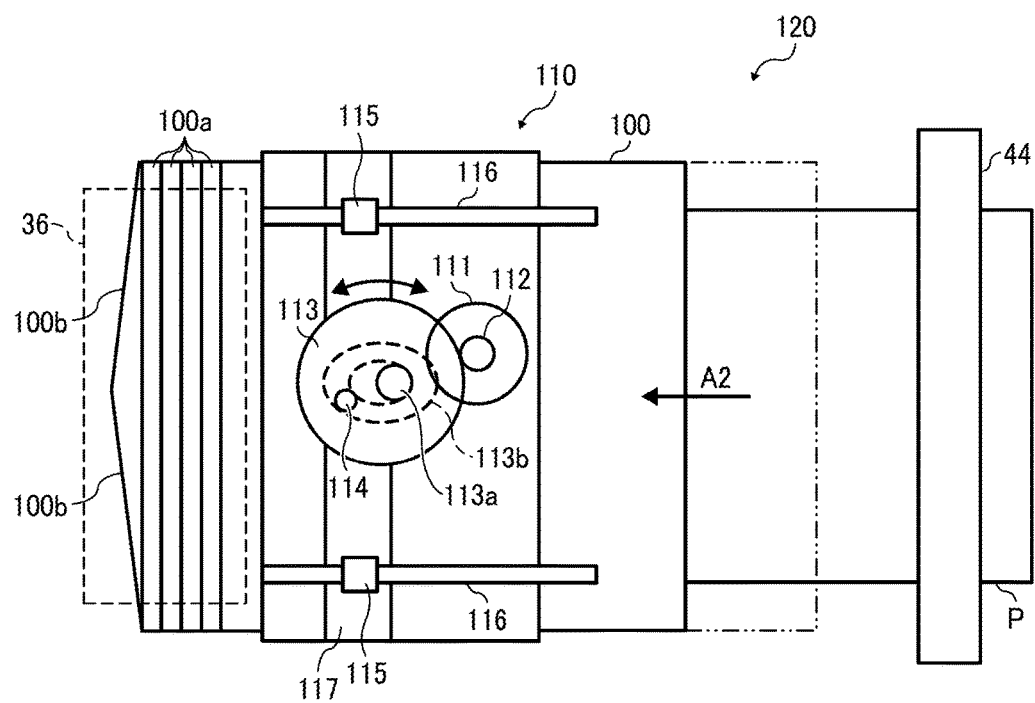
FIG. 5 is a plan view illustrating the image reading device of FIG. 2.

As illustrated in FIG. 5, the transmission shaft 114 is disposed in a groove 113b (indicated by a dotted circle line) that is formed inside the first cam 113. The transmission shaft 114 is rotatable in the groove 113b along with rotation of the first cam 113. The bearings 115 are mounted on both sides in the width direction of the fixing plate 117. Each of the bearings 115 is engaged with a corresponding one of the guide shafts 116. With this configuration, the bearings 115 move along the respective guide shafts 116 in a horizontal direction, that is, in a left-and-right direction in the drawing. The guide shafts 116 may be formed by a resin material, for example.

As the rotary shaft 112 rotates by a driving force generated by the motor 111, the driving force of the motor 111 is transmitted to the first cam 113 that is in contact with the rotary shaft 112. This transmission of the driving force rotates the first cam 113 about the shaft 113a, so that the transmission shaft 114 moves in the groove 113b. The fixing plate 117 has rigidity greater than other members, and therefore is not deformed due to transmission of the driving force from the transmission shaft 114.

Due to movement of the transmission shaft 114 inside the guide shaft 116, the bearings 115 disposed on the fixing plate 117 move along the respective guide shafts 116. According to this configuration, the correction plate 100 connected to the fixing plate 117 moves reciprocally, that is, in a direction indicated by arrow A2 and an opposite direction to the direction A2.

The correction plate 100 is used as a reference member to perform shading correction, which is described below. The correction plate 100 includes multiple belt-shaped reflection members 100a having different amounts of reflected light from each other. The multiple belt-shaped reflection member 100a are disposed on an opposed face 100g, part of which faces the exposure glass 36a, and at a downstream side of the opposed face 100g in the sheet conveying direction of the recording medium P.

In addition, a downstream side end of the correction plate 100 in the sheet conveying direction of the recording medium P has a tapered shape including a tapered face 100b. The correction plate 100 is formed in a shape of a thin plate by a material such as stainless steel and PEP film.

In a case in which the recording medium P is conveyed to the image reading device 120, the correction plate 100 is located at a retreating position (e.g., a position indicated by a dotted line in FIG. 4) that is an upstream side in the sheet conveying direction to be retreated at a position where the belt-shaped reflection member 100a does not face the exposure glass 36a.

As illustrated in FIG. 4, in a state in which the correction plate 100 is located at the retreating position, the driving device 110 includes a cover 118 at a position facing the belt-shaped reflection member 100a to cover the belt-shaped reflection member 100a. The cover 118 protects the belt-shaped reflection member 100a from light coming from outside. At the same time, the cover 118 can provide dustproof effect to prevent adhesion of foreign materials such as paper dust onto the belt-shaped reflection member 100a. The cover 118 is formed by non-woven cloth in an area covering the belt-shaped reflection member 100a.

The correction plate 100 is disposed above the sheet conveying passage 103 of the recording medium P when the correction plate 100 is located at the retreating position. The correction platen 100 includes a guide face 100e that is the opposite side of the opposed face 100g. The guide face 100e is disposed facing the sheet conveying passage 103 to guide the recording medium P with the upwardly curled leading end toward the sheet conveying passage 103. The correction plate 100 is inclined toward a lower guide plate 104 or the movable guide plate 123 as the correction plate 100 is shifted to the downstream side of the sheet conveying direction. With this configuration, the sheet conveying passage 103 of the recording medium P is narrowed as the sheet conveying passage 103 goes to the downstream side in the sheet conveying direction. Therefore, the recording medium P is guided to a region between the CIS 36 and the movable guide plate 123 reliably. Accordingly, the correction plate 100 functions as an upper guide plate to guide the recording medium P to a correct sheet conveying passage while restraining or preventing the curling of the leading end of the recording medium P, so that the recording medium P is conveyed along the sheet conveying passage 103 defined by the guide face 100e and the lower guide plate 104.

The guide face 100e is processed by the mirror surface machining to prevent unevenness of the surface thereof. With the mirror surface machining performed, when the curled leading end of the recording medium P contacts the guide face 100e, a friction force applied between the recording medium P and the guide face 100e is restrained to the smallest degree. Therefore, the recording medium P is prevented from being scratched on the surface and from producing paper dust. In addition, when performing a duplex printing job, the surface of the recording medium P is prevented from being damaged due to toner and from changing in glossiness. The guide face 100e may be coated with Teflon resin materials after due consideration of the frictional resistance of the surface.

As illustrated in FIG. 5, as the motor 111 is driven, the bearing 115 mounted on the fixing plate 117 moves along the guide shaft 116. With this movement of the bearing 115, the correction plate 100 is shifted in the direction A2 to be located at the reading position, as indicated by a solid line in FIGS. 4 and 5.

Since the correction plate 100 has the tapered face 100b, when the correction plate 100 moves from the retreating position to the reading position, the area of the leading end of the recording medium P in the moving direction of the correction plate 100 is made relatively small, and therefore the frictional resistance of the correction plate 100 with the movable guide plate 123 can be reduced. Accordingly, the correction plate 100 can be moved smoothly to the reading position.

In this configuration, the correction plate 100 has the tapered face 100b, that is, the triangle-shaped leading end in the downstream side of the sheet conveying direction. However, as long as the correction plate 100 is tapered toward the leading end, the shape is not limited to the triangle but can be, for example, a trapezoid or an oval.

As illustrated in FIG. 4, the belt-shaped reflection member 100a is disposed facing the exposure glass 36a in a state in which the correction plate 100 is located at the reading position. Consequently, as the second cam 133 rotates, the movable guide plate 123 is rotated in the counterclockwise direction to press the belt-shaped reflection members 100a against the exposure glass 36a. Then, similar to the operation on the recording medium P, when the light emitting element 36b emits light to the correction plate 100, the light is reflected on the belt-shaped reflection members 100a that is closely contacted with the exposure glass 36a and is then received by the light receiving element 36c.

The respective belt-shaped reflection members 100a are disposed across the recording medium P in the width direction and the CIS 36 including a light receiving element array is disposed in parallel to the respective belt-shaped reflection members 100a. The light receiving element array of the CIS 36 obtains data including an amount of reflection light.

The data of the amount of received reflection light is obtained as reference data. Then, a shading correction value is calculated based on the obtained reference data, so as to reflect a correction value to correct when subsequent recording media P are read. By performing the above-described shading correction, a change over time in the amount of light emitted by the light emitting element 36b and a change over time of light receive sensitivity of the light receiving element 36c are corrected. The shading correction is performed at a timing other than an image reading operation and an image forming operation when the recording medium P is conveyed. Further, the shading correction is performed at the start of the image forming apparatus 1 in a case in which a type of a recording medium P is changed and in a case in which abnormal image formation is found.

In the present embodiment, the image reading device 120 includes the correction plate 100 having the multiple belt-shaped reflection members 100a having different amounts of reflection light, so as to obtain data of the amount of reflection light. Then, the data of the amount of reflection light of the multiple belt-shaped reflection members 100a is compared with the data of the amount of reflection light of the recording medium P to be read by the image reading device 120. Thereafter, the data of a belt-shaped reflection member 100a that has the amount of reflection light closest to the amount of reflection light of the recording medium P is employed as reference data to perform the shading correction. By so doing, the amount of reflection light is optimized according to the type of the recording medium P to be used, and therefore the shading correction is performed based on the reference data that can obtain a greater S/N ratio. As a result, precision in shading correction is enhanced.

In the present embodiment, the movable guide plate 123 holds the recording medium P to contact to and separate from the light emitting and receiving face 36a1 of the exposure glass 36a in the direction intersecting the sheet conveying direction and the correction plate 100 to contact to and separate from the light emitting and receiving face 36a1 of the exposure glass 36a in the same direction intersecting the sheet conveying direction. With this configuration, both the correction plate 100 and the recording medium P are pressed against the exposure glass 36a due to a rotation operation of the movable guide plate 123 before the CIS 36 performs the reading operation. Accordingly, a holding member or unit to hold the correction plate 100 to contact to and separate from the exposure glass 36a is not provided to the image reading device 120. Further, the moving direction of the correction plate 100 from the retreating position to the reading position (i.e., the direction A2) is the same as the sheet conveying direction of the recording medium P. In addition, the direction to move the correction plate 100 to a position facing the CIS 36 is same as the direction to move the recording medium P to the position facing the CIS 36. As described above, the correction plate 100 and the recording medium P are moved to the reading position and are pressed against the exposure glass 36a under the identical condition (in other words, the identical direction). By so doing, the shading correction can be performed with less chances of errors.

The respective belt-shaped reflection members 100a are formed with paint approximate to reflectance properties of the recording medium P that is assumed to be read by the image reading device 120. In addition, respective reflectance properties are managed by respective values measured by a reflectometer.

The multiple belt-shaped reflection members 100a have respective lengths in the sheet conveying direction, such that any one of the multiple belt-shaped reflection members 100a does not cause any negative impact on the results when adjacent one of the respective belt-shaped reflection members 100a is read. In addition, the respective belt-shaped reflection members 100a are disposed across the recording medium P in the width direction in parallel to the light receiving element array including the multiple light receiving elements aligned in the width direction of the CIS 36. A width of each of the multiple belt-shaped reflection members 100a is greater than a width of various types of recording media P to which the shading correction is performed. For example, the width of each belt-shaped reflection member 100a is arranged across the entire width of the correction plate 100.

As another embodiment of this disclosure, a recording medium P that is the same type of the recording medium P to be read by the image reading device 120 is attached with paste or glue on the surface of the correction plate 100 to function as a belt-shaped reflection member 100a. In this case, respective thicknesses of adjacent two belt-shaped reflection members 100a are different, and therefore respective distances relative to the exposure glass 36a become different. Therefore, the sufficient lengths of the adjacent belt-shaped reflection members 100a in the sheet conveying direction are provided to read image data at an appropriate focal length. At the same time, these adjacent belt-shaped reflection members 100a are prevented from any negative impact when the adjacent belt-shaped reflection members 100a.

Figure 6:
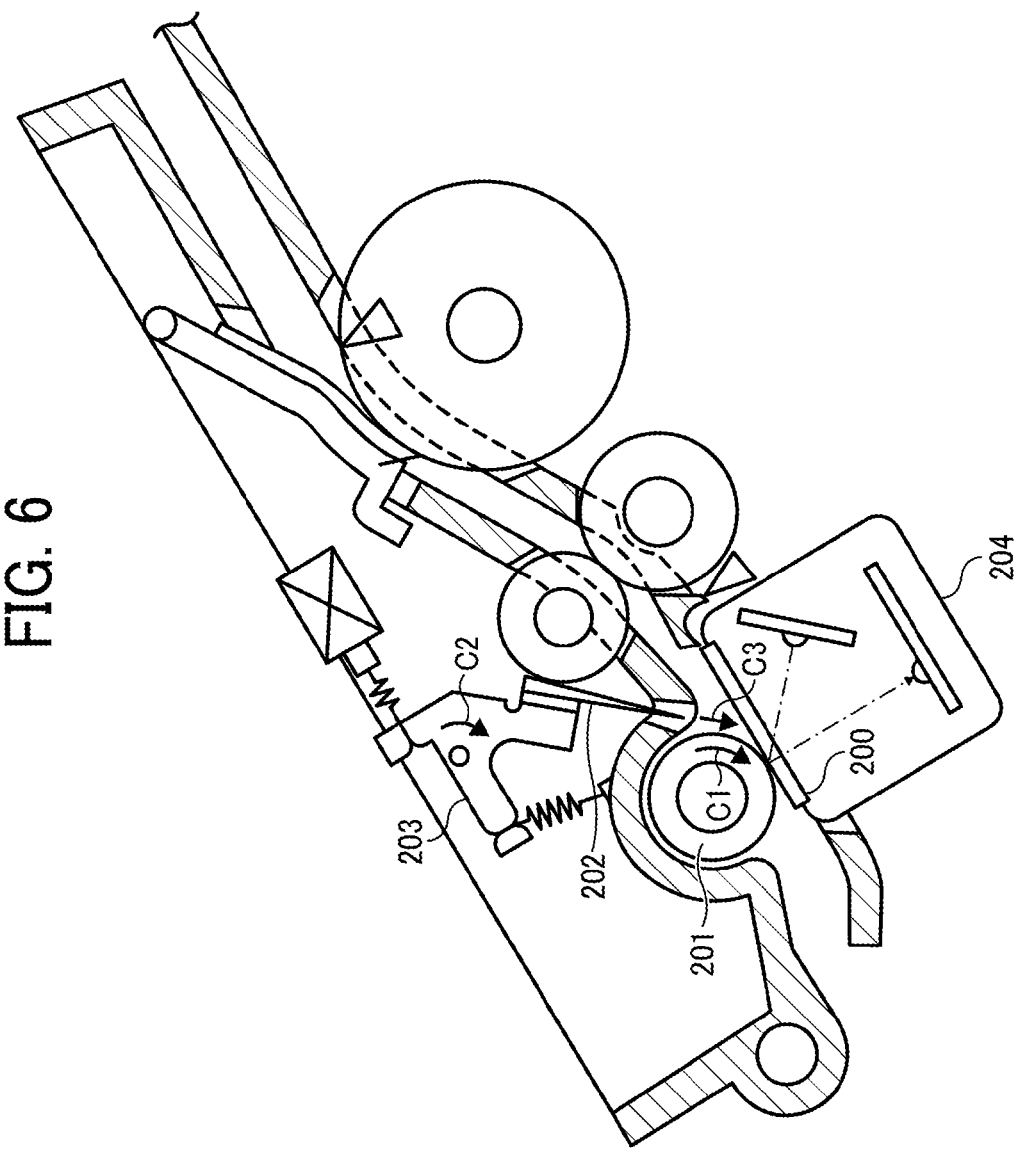
FIG. 6 is a schematic diagram illustrating a comparative image reading device.

By contrast, a comparative image reading device includes an exposure glass 200 and a rear roller 201 disposed facing the exposure glass 200, as illustrated in FIG. 6. When a recording medium such as a paper is conveyed to the exposure glass 200, the rear roller 201 rotates in a direction indicated by arrow C1 to convey the recording medium between the exposure glass 200 and the rear roller 201, where a contact image sensor 204 reads the image formed on the recording medium. The comparative image reading device also includes a white reference sheet 202 above the rear roller 201. The white reference sheet 202 is moves with rotation of an arm 203 in a direction indicated by arrow C2 from a standby position in FIG. 6 toward a direction indicated by arrow C3 to be located at a reading position. Along with the rotation of the rear roller 201 in the direction C1, the white reference sheet 202 located at the reading position is conveyed between the exposure glass 200 and the rear roller 201. Then, the image on the white reference sheet 202 is read by the contact image sensor 204, followed by shading correction.

However, image reading devices such as the above-described comparative image reading device cannot adjust the position of the white reference sheet 202 with respect to the contact image sensor 204. Generally, an image reading mechanism such as a contact image sensor 204 is designed to have a focal length on a surface of the exposure glass. By reading a reference member such as a white reference sheet placed in contact with the exposure glass 200, an image is read at an optimal distance. However, due to component tolerances and assembly tolerances of the exposure glass, the surface of the exposure glass 200 does not constantly meet the focal length of the image reading mechanism.

In the present embodiment, an amount of reflection light is measured each time the movable guide plate 123 approaches the light emitting and receiving face 36a1 of the exposure glass 36a by 10 μm (in other words, each time the belt-shaped reflection member 100a approaches the light emitting and receiving face 36a1 by 10 μm) in the process from the belt-shaped reflection member 100a approaches the exposure glass 36a to the belt-shaped reflection member 100a contacts the exposure glass 36a due to movement of the movable guide plate 123. Then, in a state in which the belt-shaped reflection member 100a is in close contact with the exposure glass 36a, the amount of reflection light is measured again. Due to component tolerances and assembly tolerances of the exposure glass 36a, it is not true that the surface of the exposure glass 36a is constantly located at a position that meets the focal length of the CIS 36. Therefore, the amount of reflection light is measured each time the movable guide plate 123 (the belt-shaped reflection member 100a) moves by 10 μm. Measured data having the highest S/N ratio among the results of the measurement is employed as reference data used for shading correction, thereby enhancing the precision of shading correction. In the above-described operation, the amount of reflection light is measured each time the belt-shaped reflection member 100a approaches the exposure glass 36a by 10 μm. However, the distance to perform measurement of the amount of reflection light is not limited to 10 μm but can be any other optional numbers.

FIG. 7 is a graph of measurement results of the output voltage of each light receiving element 36c obtained at different distances between the movable guide plate 123 (the belt-shaped reflection member 100a) and the CIS 36. A horizontal axis indicates a position of read pixels and a vertical axis indicates an output voltage. As one example, a solid line M1 in the graph of FIG. 7 indicates the output voltage of the light receiving element 36c obtained at a position at which the belt-shaped reflection member 100a comes closest to the exposure glass 36a (that is, "a close position" to be described below). The solid line M1 forms a waveform having a rise greater than respective waveforms of solid lines M2 and M3. According to the comparison in the graph of FIG. 7, data of the solid line M1 is employed as reference data. As described above, data of the amount of reflection light is obtained each time the movable guide plate 123 approaches the exposure glass 36a by 10 μm, and the data having the highest S/N ratio is selected as reference data used for shading correction.

Here, a description is given of the positions of the movable guide plate 123 in different states.

When the correction plate 100 moves between the retreating position and the reading position, the second cam 133 comes to contact the one end 123b at the short diameter portion and is retained at the position where the movable guide plate 123 is most separated from the exposure glass 36a (that is, the position in FIG. 4). Hereinafter, the position is referred to as a separate position of the movable guide plate 123. According to this configuration, the correction plate 100 can avoid contacting the exposure glass 36a, and therefore is prevented from scratching on the belt-shaped reflection member 100a and the exposure glass 36a while the correction plate 100 is moving.

Figure 8:
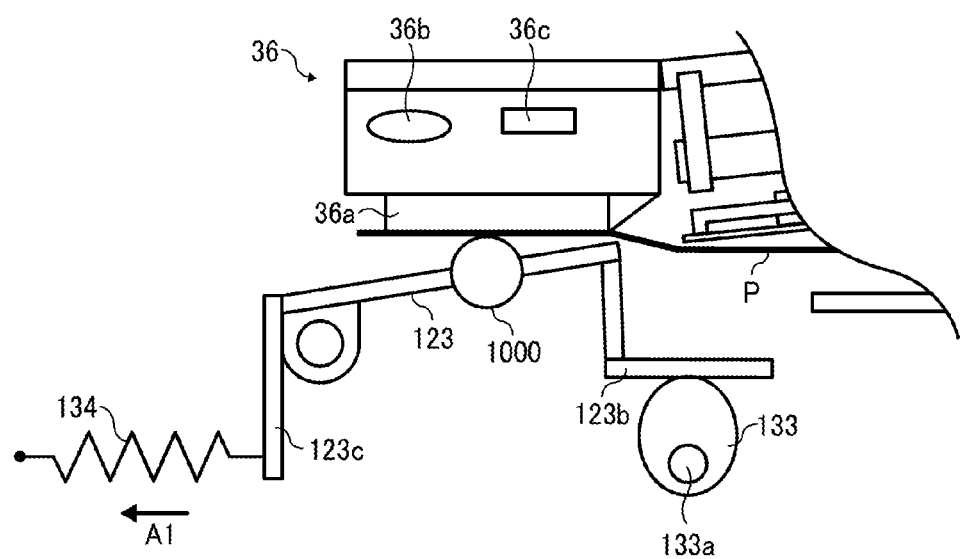
FIG. 8 is a cross sectional view illustrating the image reading device of FIG. 2 in a state in which a movable guide plate is located at a close position.

When the recording medium P and the correction plate 100 are pressed against the exposure glass 36a, the long diameter portion of the second cam 133 comes to contact with the one end 123b of the movable guide plate 123, where the distance of a gap between the movable guide plate 123 and the exposure glass 36a is the narrowest. This position is indicated in FIG. 8 and is hereinafter referred to as a close position of the movable guide plate 123.

When the multiple belt-shaped reflection members 100a provided to the correction plate 100 are read, the multiple belt-shaped reflection members 100a are sequentially located to the reading position facing the exposure glass 36a. Specifically, each time reading of one belt-shaped reflection member 100a is completed, the correction plate 100 is shifted by a relatively small distance in the sheet conveying direction, so as to perform the reading operation on a subsequent belt-shaped reflection member 100a.

Figure 10:
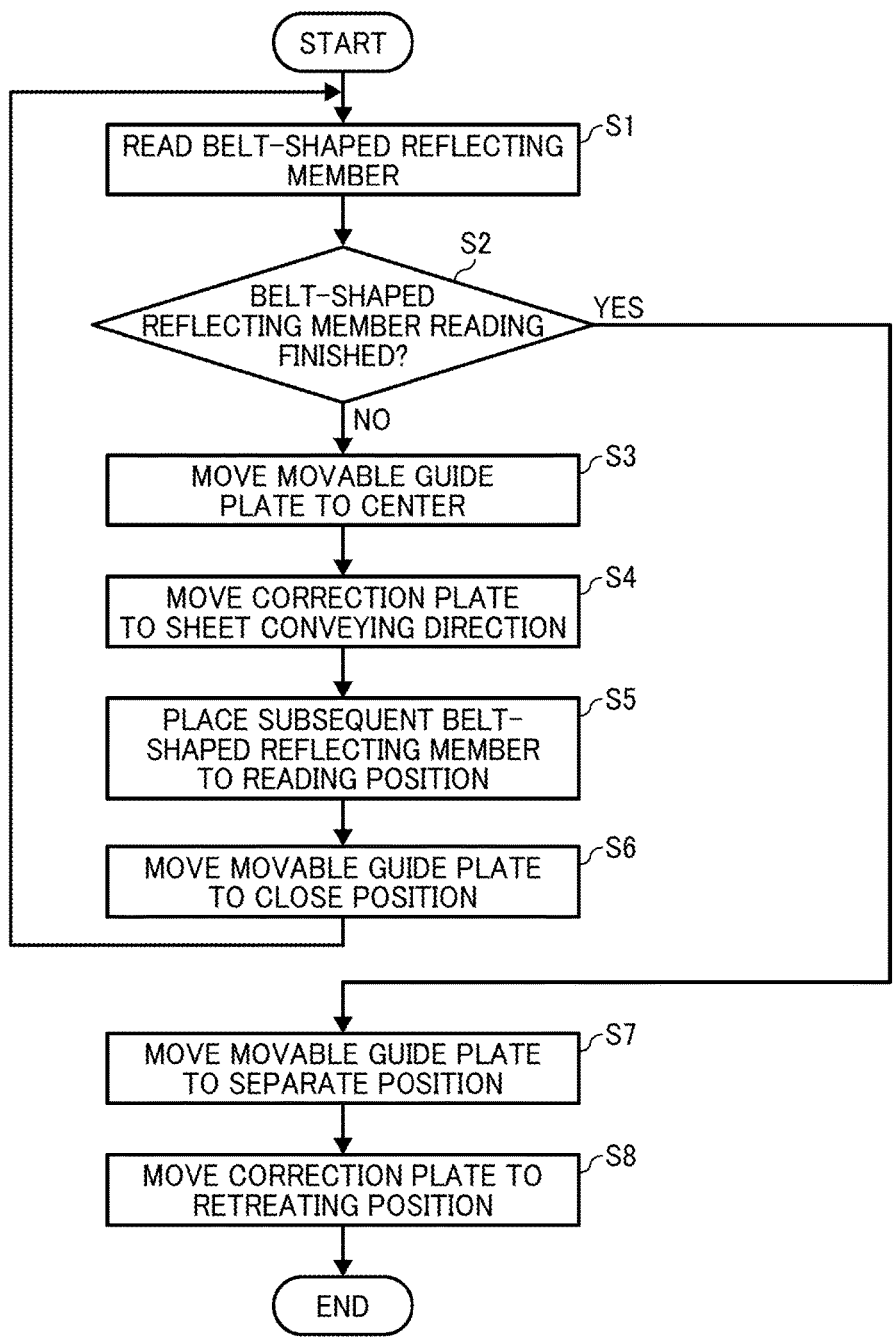
FIG. 10 is a flowchart of steps of a reading operation of multiple belt-shaped reflection members.

FIG. 10 is a flowchart of the reading operation of reading the multiple belt-shaped reflection members 100a.

First, the correction plate 100 moves from the retreating position to the reading position. With this movement of the correction plate 100, a leading (extreme downstream) belt-shaped reflection member 100a is moved to be located at the reading position. Then, the CIS 36 reads the leading belt-shaped reflection member 100a, in step S1. After completion of reading of the leading belt-shaped reflection member 100a, a subsequent belt-shaped reflection member 100a is read. The reading operation continues until the whole belt-shaped reflection members 100a are read.

Then, it is determined whether the whole belt-shaped reflection members 100a are read, in step S2.

When any unread belt-shaped reflection members 100a are left, that is, when the whole belt-shaped reflection members 100a are not read (NO in step S2), a subsequent unread belt-shaped reflection member 100a is moved to be located at the reading operation to be read.

Figure 9:
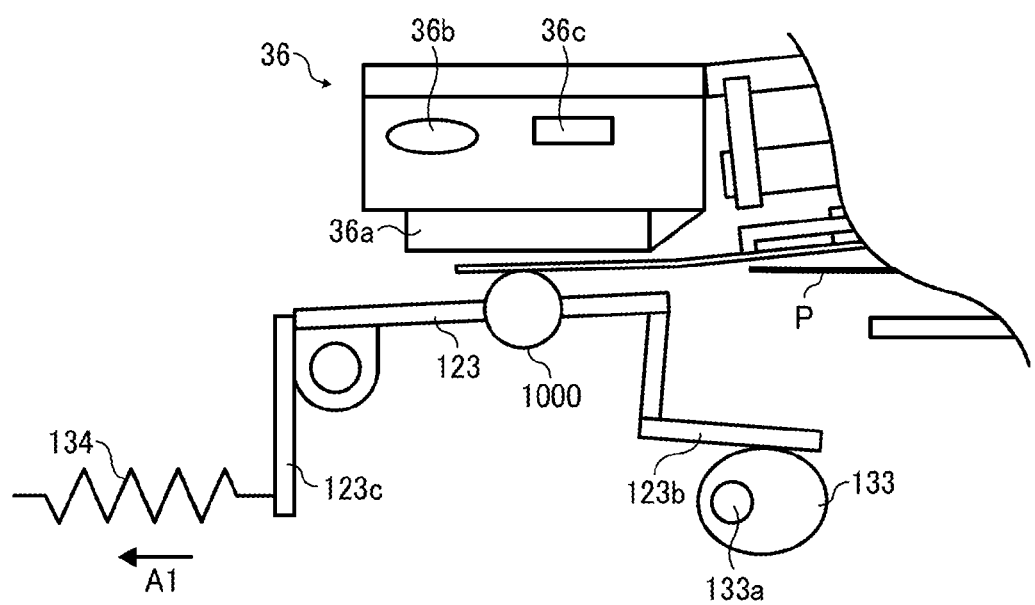
FIG. 9 is a cross sectional view illustrating the image reading device of FIG. 2 in a state in which the movable guide plate is located at an intermediate position.

The movable guide plate 123 is moved to an intermediate position as illustrated in FIG. 9, in step S3. The intermediate position is a position where the gap E between the movable guide plate 123 and the exposure glass 36a is located between the close position and the separate position. Accordingly, the correction plate 100 can be moved in the sheet conveying direction without causing friction with the belt-shaped reflection member 100a with the exposure glass 36a.

Then, the correction plate 100 is moved in the sheet conveying direction by a relatively small distance, in step S4, and the subsequent belt-shaped reflection member 100a is moved to be located at the reading position, in step S5.

The movable guide plate 123 is shifted to the close position, in step S6. By so doing, the subsequent belt-shaped reflection member 100a comes to closely contact the exposure glass 36a. Accordingly, the procedure returns to step S1 and the CIS 36 reads the subsequent belt-shaped reflection member 100a.

The above-described steps are repeated until the CIS 36 finishes to read the whole belt-shaped reflection members 100a. When the whole belt-shaped reflection members 100a are read, in step S2, the movable guide plate 123 is shifted to the separate position, in step S7, together with movement of the correction plate 100 to the retreating position, in step S8. Alternatively, the correction plate 100 may be moved to the retreating position (step S8) after the movable guide plate 123 has been completely shifted to the separate position (step S7).

The intermediate position is set to have the gap E of approximately 1 mm between the movable guide plate 123 and the exposure glass 36a and a same thickness as the recording medium P that is conveyed to the image reading device 120.

The separate position is set to have the gap E of approximately 3 mm between the movable guide plate 123 and the exposure glass 36a.

Figure 11:
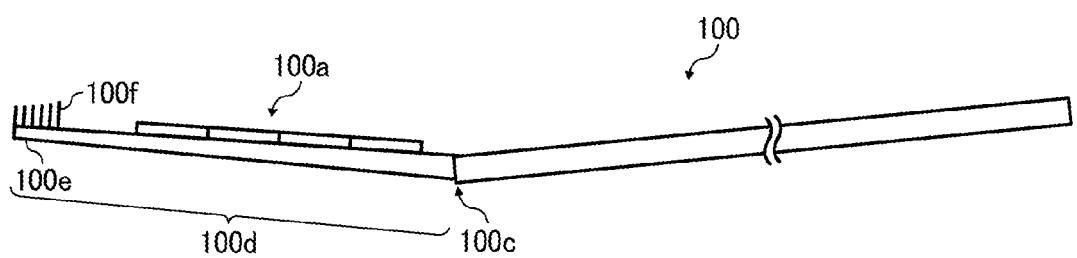
FIG. 11 is a side view illustrating a correction plate.

As illustrated in FIG. 11, the correction plate 100 includes a boundary 100c and an elastic portion 100d. The elastic portion 100d is an elastic member disposed facing the CIS 36. The elastic portion 100d is disposed at a downstream side from the boundary 100c of the correction plate 100 in the sheet conveying direction.

When the correction plate 100 moves from the retreating position to the reading position, even while the guide face 100e of the correction plate 100 is in contact with the movable guide plate 123, the elastic portion 100d that functions as a flexible body is deformed. By being deformed, the elastic portion 100d moves along the sheet conveying passage of the recording medium P to the reading position to achieve smooth movement of the correction plate 100. Further, when the belt-shaped reflection member 100a is pressed against the exposure glass 36a after the correction plate 100 has reached the reading position, the elastic portion 100d is deformed toward the exposure glass 36a, so that the belt-shaped reflection member 100a is pressed against the exposure glass 36a smoothly.

The elastic portion 100d can be formed thinner than the other part of the correction plate 100, for example. Alternatively, the elastic portion 100d can be formed by a flexible member. For example, the elastic portion 100d can be formed by material such as stainless steel or brass, having a thickness of approximately 0.1 mm, or by another material such as PET (polyethylene telephthalate) film or synthetic paper, having a thickness of from 0.2 mm to 0.3 mm. Further alternatively, the correction plate 100 can be molded with resin material having a relatively low stiffness such as ABS (acrylonitrile-butadiene-styrene) resin, with the elastic portion 100d formed thinner than the other part of the correction plate 100.

Further, a cutout is provided to the boundary 100c. With this configuration, the leading end of the correction plate 100 at the downstream side in the sheet conveying direction may be the elastic portion 100d. Alternatively, the boundary 100c functions as a rotation fulcrum and a shaft is provided to the boundary 100c, for example. With this configuration, the elastic portion 100d may be disposed rotatable about the shaft with respect to a main body (except the elastic portion 100d) of the correction plate 100.

The correction plate 100 includes a fiber flocked portion 100f at a downstream end in the sheet conveying direction. In the fiber flocked portion 100f, linear fibrous members extending toward the exposure glass 36a are fixed, for example, glued on the surface of the correction plate 100. The length of the fibrous members is set to 0.5 mm, for example. With the fiber flocked portion 100f provided, even when the correction plate 100 contacts the exposure glass 36a, the correction plate 100 can remove foreign materials such as dust adhered on the surface of the exposure glass 36a without scratching the surface of the exposure glass 36a.

When the correction plate 100 moves from the reading position to the retreating position (step S8 in FIG. 10), the fiber flocked portion 100f contacts the surface of the exposure glass 36a to remove foreign material such as dust.

Figure 12:
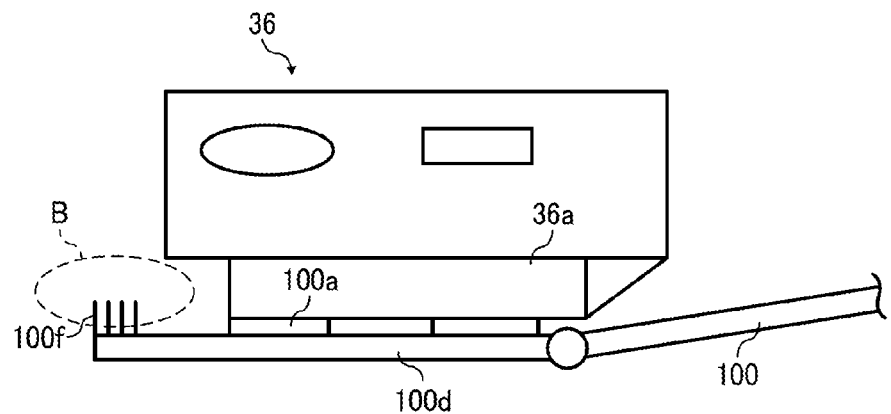
FIG. 12 is a schematic diagram illustrating an evacuation space of a fiber flocked portion.

As illustrated in FIG. 12, in a state in which the correction plate 100 is located at the reading position and pressed against the exposure glass 36a by the movable guide plate 123, the fiber flocked portion 100f is retreated to an evacuation space B that is provided at the downstream side of the CIS 36 in the sheet conveying direction, and therefore does not contact the CIS 36. According to this configuration, the fiber flocked portion 100f contacts the exposure glass 36a before the belt-shaped reflection member 100a closely contacts the exposure glass 36a. Therefore, a pressing force is applied to the elastic portion 100d to prevent deformation of the belt-shaped reflection member 100a. Accordingly, the belt-shaped reflection member 100a can be pressed to the exposure glass 36a smoothly.

The correction plate 100 according to the present embodiment includes five (5) types of belt-shaped reflection members 100a, for example. However, there are various types of recording media P to be read by the image reading device 120. Therefore, it is not likely that a single correction plate 100 having some belt-shaped reflection members 100a can cover the whole types of recording media P.

In order to address this inconvenience, there are multiple correction plates 100, each including multiple belt-shaped reflection members 100a having different reflectance properties. With this configuration, one of the multiple correction plates 100 is selected according to the type of a recording medium P to be read by the image reading device 120.

Figure 13:
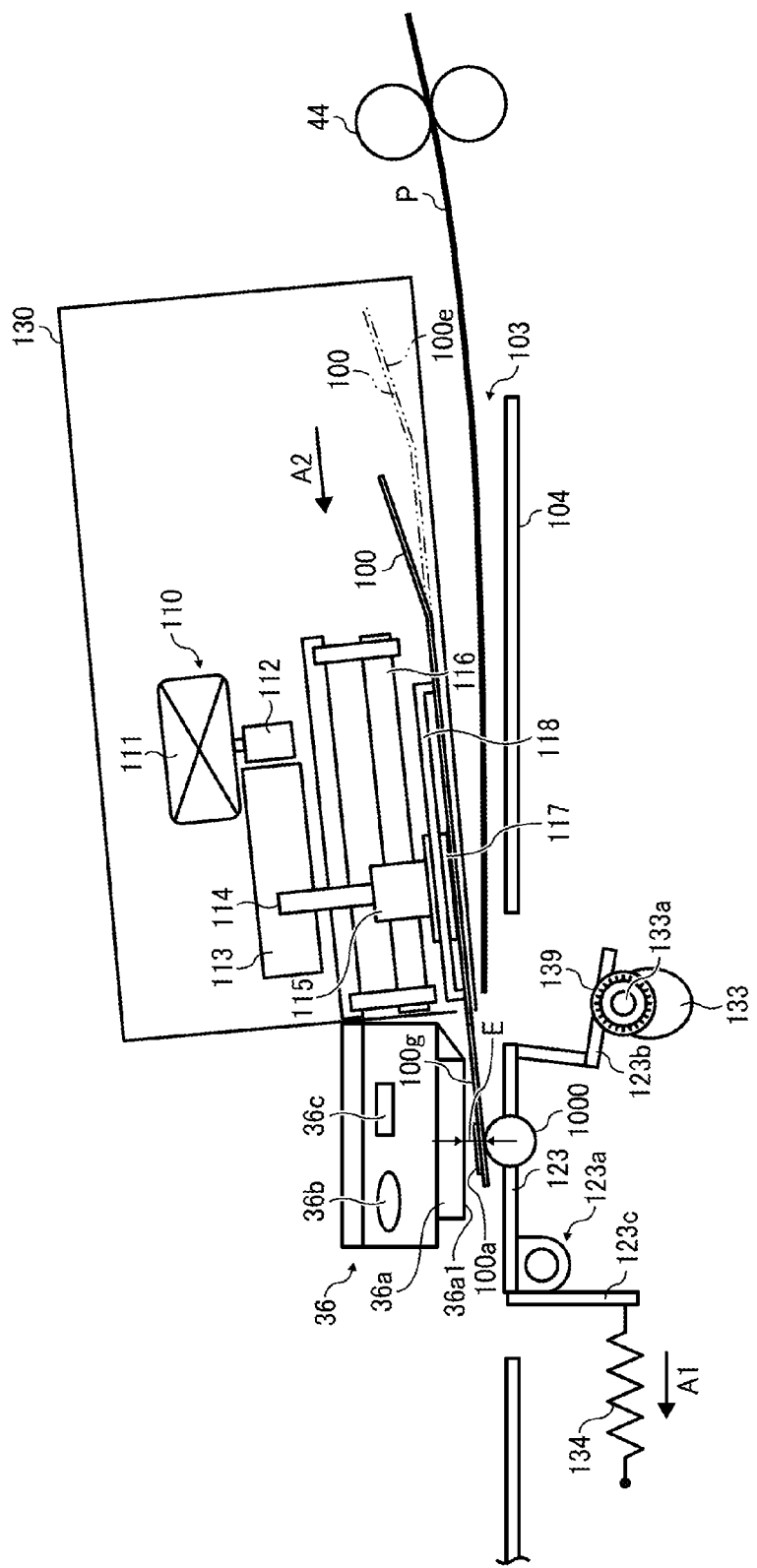
FIG. 13 is a cross sectional view illustrating the image reading device provided with a cartridge.

Specifically, a replaceable cartridge 130 for shading correction is prepared for each type of the multiple correction plates 100. FIG. 13 is a cross sectional view illustrating the image reading device provided with a selected cartridge 130 applicable to the selected one of the multiple correction plates 100. Each cartridge 130 includes the selected correction plate 100 and the driving device 110 integrally and is detachably attached to one of the image reading device 120 and the image forming apparatus 1.

In other words, the above-described configuration includes a cartridge having a reference member and a driving device. The reference member includes multiple belt-shaped reflection members having different amounts of reflection light from each other. The driving device causes the reference member to reciprocate between the retreating position and the close position. The cartridge is detachably attached to either one of the image reading device and the image forming apparatus.

Each cartridge 130 is provided with written information so that a user can visually distinguish which type of correction plate is loaded, from outside.

Here, when the recording medium P passes through the image reading device 120, the gap E can be a constant value by disposing the movable guide plate 123 to a predetermined position or can be a value automatically changeable based on information inputted by the user.

Figure 14:
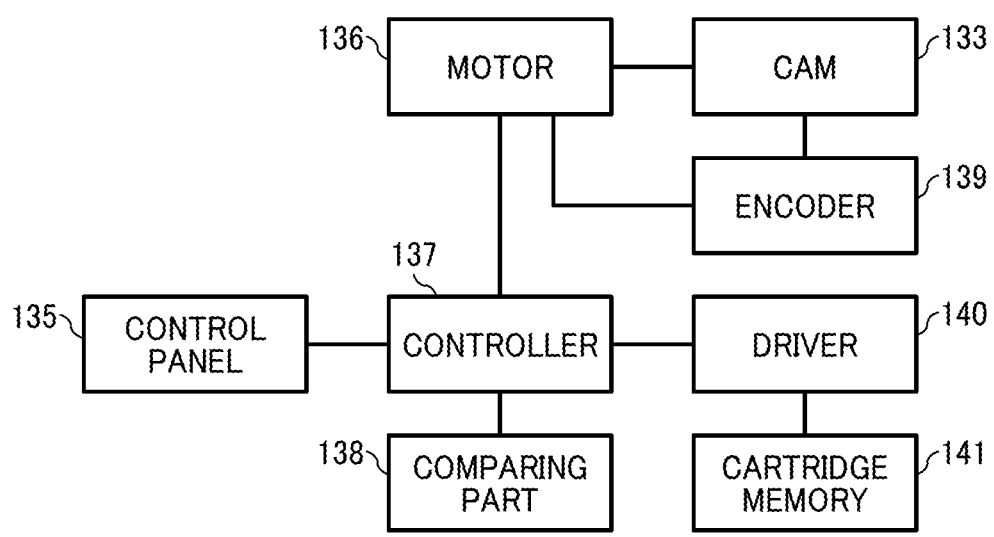
FIG. 14 is a block diagram illustrating a configuration of a controller included in the image forming apparatus of FIG. 1.

Next, a description is given of a case in which the gap E is automatically changed, with reference to FIG. 14.

First, a user inputs information related to type and size of a recording medium P into a controller 137 of the image forming apparatus 1 via a control panel 135. Respective thicknesses according to various types of recording media P are stored in a comparator 138. The controller 137 calculates a corresponding thickness of the recording medium P based on the information of type of the recording medium P that is inputted by the user via the control panel 135.

Then, the controller 137 causes a motor 136 to drive based on the inputted information of the recording medium P, so that the amount of movement of the movable guide plate 123 to the CIS 36 is adjusted, and the gap E between the movable guide plate 123 and the CIS 36 is also adjusted. The motor 136 is coupled with the second As described above, the gap E can be adjusted based on the information inputted by the user.

The cartridge 130 is coupled with the controller 137 of the image forming apparatus 1 via a connector, for example, so as to receive supply of power from a driver 140 of the image forming apparatus 1. In addition, coupling of the connector can connect an electrical signal line with the image forming apparatus 1 and decoupling of the connector can disconnect the electrical signal line from the image forming apparatus 1.

The correction plate 100 stores code information therein. By coupling the cartridge 130 and the image forming apparatus 1 via the connector, the controller 137 can read the type of the belt-shaped reflection member 100a stored in a storing portion 141 of the cartridge 130.

Then, by comparing with the type of the recording medium P inputted by the user, whether the cartridge 130 is appropriate to the recording medium P to be used is acknowledged by the image forming apparatus 1. When the cartridge 130 is not appropriate to the recording medium P, the control panel 135 can display a warning message to inform the user.

In the above-described embodiments, the type of the recording medium P is discriminated based on the data inputted by the user. However, the configuration is not limited thereto. For example, a sensor to discriminate the type of a recording medium P may be provided to the image forming apparatus 1.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image reading device comprising:
an image sensor configured to read one of a recording medium and the recording medium together with a background area adjacent to the recording medium;
a correction plate configured to provide a reference in shading correction; and
a movable guide plate facing the image sensor, the movable guide plate being a separate plate from the correction plate, the movable guide plate configured to hold the recording medium and the correction plate in a direction intersecting a sheet conveying direction of the recording medium such that the recording medium and the correction plate contact to and separate from the image sensor.

2. The image reading device according to claim 1, wherein
the correction plate is movable between a close position to a separate position, the correction plate being relatively closer to the image sensor in the close position as compared to the separate position, the correction plate is movable in the sheet conveying direction of the recording medium reciprocally between a reading position facing the image sensor and a retreating position at which the correction plate is moved from the reading position, and the image reading device is configured to move the correction plate to the retreating position after moving the movable body to the separate position.

3. The image reading device according to claim 2, wherein the correction plate includes an opposed face facing the image sensor and a guide face opposite the opposed face.

4. The image reading device according to claim 2, wherein the correction plate includes a tapered face having a shape in which a width of the correction plate gradually decreases toward a downstream end of the correction plate.

5. The image reading device according to claim 2, wherein the correction plate includes a flexible portion facing the image sensor.

6. The image reading device according to claim 2, wherein the correction plate includes a fiber flocked portion on an opposed face facing the image sensor.

7. The image reading device according to claim 2, wherein the correction plate includes multiple reflectors on an opposed face facing the image sensor and having different amounts of reflected light from each other.

8. The image reading device according to claim 7, wherein the multiple reflectors include multiple belt-shaped reflectors.

9. The image reading device according to claim 8, further comprising:
a cover configured to cover the multiple belt-shaped reflectors when the correction plate is located at the retreating position.

10. The image reading device of claim 1, further comprising:
a cover configured to selectively cover at least a portion of the correction plate based on a position of the correction plate.

11. The image reading device of claim 1, wherein the correction plate is configured to selectively move into a gap between the image sensor and the movable guide plate.

12. The image reading device of claim 1, wherein
a plane of receiving face of the image sensor is parallel to the sheet conveyance direction,
the correction plate is configured to move in the sheet conveyance direction, and
the movable guide plate is configured to press the correction plate towards the receiving face of the image sensor.

13. A method of reading an image using an image reading device, the image reading device including an image sensor, a correction plate, and a movable guide plate facing the image sensor and being a separate plate from the correction plate, the image sensor configured to read one of a recording medium and the recording medium together with a background area adjacent to the recording medium, the correction plate configured to provide a reference in shading correction, and the movable guide plate configured to hold the recording medium and the correction plate in a direction intersecting a sheet conveying direction of the recording medium such that the recording medium and the correction plate contact to and separate from the image sensor, the method comprising:
moving the correction plate to a reading position facing the image sensor from a retreating position separated from the reading position;
locating at least one reflector at the reading position;
reading the at least one reflector;
moving the movable guide plate to an intermediate position located between a close position at which the movable guide plate and the image sensor are close to each other and a separate position at which the movable guide plate and the image sensor are separated from each other;
shifting the correction plate in the sheet conveying direction by a distance;
moving the movable guide plate to the separate position; and
shifting the correction plate to the retreating position.

14. An image forming apparatus comprising:
the image reading device according to claim 1; and
an image forming device configured to form an image on a surface of the recording medium positionally corrected by the image reading device.

* * * * *